United States Patent [19]

Vardi et al.

[11] 4,440,001
[45] Apr. 3, 1984

[54] CHILLERS

[75] Inventors: Isaih Vardi, Rehovot; Yigal Kimchi, Ramat Gan; Jonathan Ben-Dror, Hadar Am, all of Israel

[73] Assignee: Eshel Residual Energy for Cooling and Heating Ltd., Azor, Israel

[21] Appl. No.: 357,593

[22] Filed: Mar. 12, 1982

Related U.S. Application Data

[63] Continuation-in-part of Ser. No. 150,044, May 15, 1980, abandoned.

[30] Foreign Application Priority Data

May 16, 1979 [IL] Israel ..................... 57308

[51] Int. Cl.³ ............................................. F25B 43/04
[52] U.S. Cl. ................................................. 62/475
[58] Field of Search ................................. 62/475, 479

[56] References Cited

U.S. PATENT DOCUMENTS

| | | | |
|---|---|---|---|
| 2,160,394 | 5/1939 | Weaver | 62/475 |
| 2,180,441 | 11/1939 | Tibbetts | 62/475 |
| 2,316,104 | 4/1943 | Reiss | 62/475 |
| 2,400,137 | 5/1946 | Reid, Jr. | 62/475 |
| 2,400,138 | 5/1946 | Buffington | 62/475 |
| 2,722,805 | 11/1955 | Leonard, Jr. | 62/475 X |
| 2,722,806 | 11/1955 | Leonard, Jr. | 62/475 |
| 2,940,273 | 6/1960 | Leonard, Jr. | 62/475 |
| 2,940,274 | 6/1960 | McGrath | 62/475 |
| 3,013,404 | 12/1961 | Endress et al. | 62/475 X |
| 3,357,197 | 12/1967 | Massengale | 62/475 X |
| 3,360,950 | 1/1968 | Osborne | 62/475 X |
| 3,597,936 | 8/1971 | Dyre | 62/475 |
| 4,169,356 | 10/1979 | Kingham | 62/475 X |

*Primary Examiner*—Lloyd L. King
*Attorney, Agent, or Firm*—Fleit, Jacobson, Cohn & Price

[57] ABSTRACT

The present invention relates to a chiller of the type wherein water is used as refrigerant and lithium bromide or a similar compound as absorbant. A conduit or line is provided leading from the refrigeration pump which conveys dilute aqueous lithium bromide or similar compound, from the evaporator section. The line is provided with a valve for blocking fluid flow when not in use and for tight closure of the line. According to one embodiment, the conduit or line is adapted to be connected to a conduit leading to a purge storage tank through which dilute lithium bromide is introduced into the absorber.

1 Claim, 1 Drawing Figure

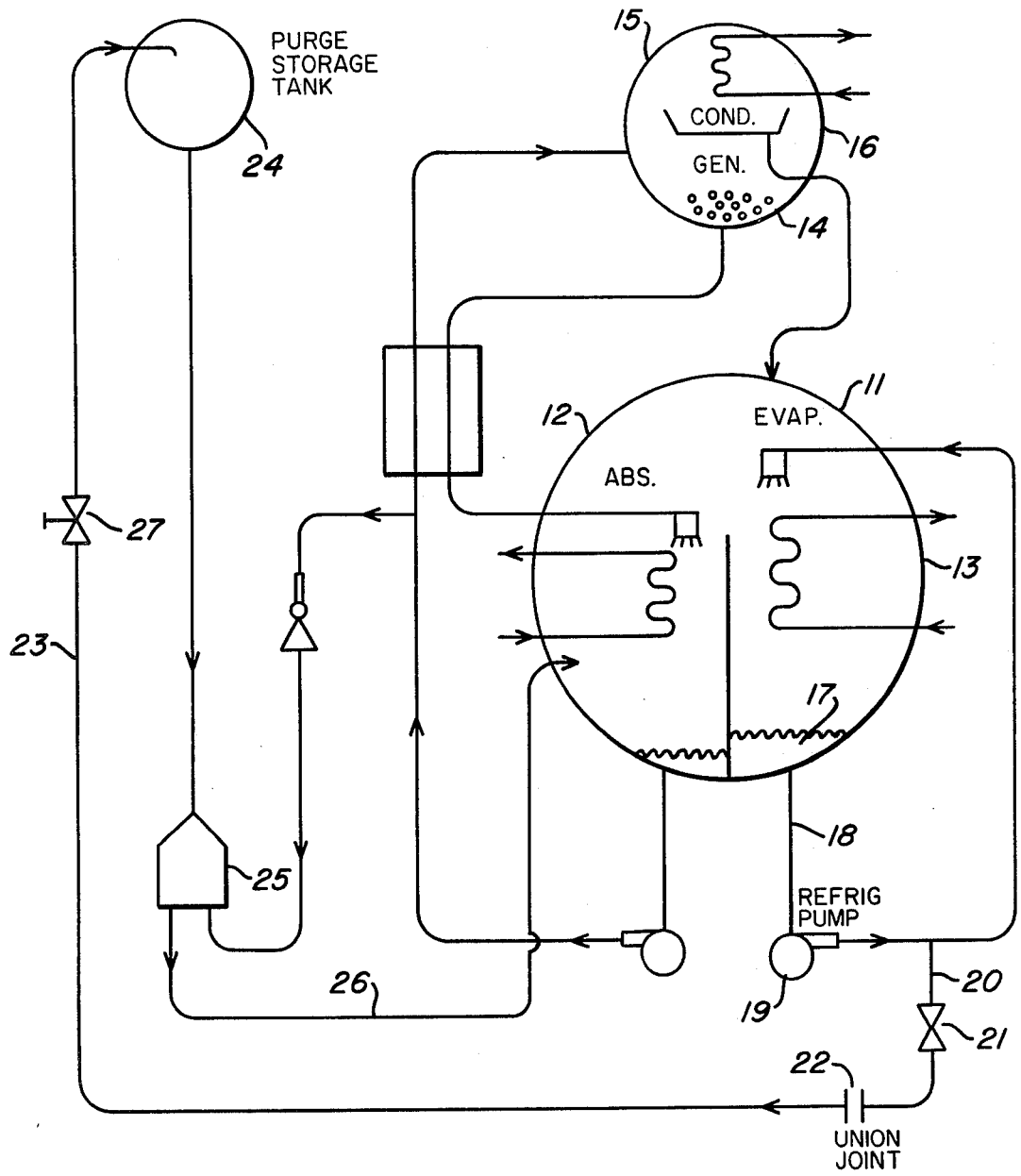

CHILLERS

RELATION TO OTHER APPLICATIONS

The present invention is a CIP application to U.S. Pat. Application No. 150,044 filed May 15, 1980, now abandoned.

FIELD OF THE INVENTION

The invention relates to improvements in chillers of the type using water as refrigerant and lithium bromide or other similar compounds as absorbant. The invention relates to an improvement in the means for removing dilute lithium bromide solution from time to time from the evaporator compartment and for its subsequent use in other parts of the refrigeration cycle.

BACKGROUND OF THE INVENTION

Theoretically only water ought to be present in the evaporator compartment. In practice some lithium bromide is carried over from the absorber or from the condenser and if this accumulates, the effect is one of reduction of efficiency of the chiller. It is thus necessary to remove from time to time the dilute lithium bromide solution and to replace it by water. Furthermore, non-condensables tend to accumulate and these too have to be removed from time to time.

In systems using a high concentration lithium bromide solution, when the chiller was shut down overnight, there has to be added water or dilute lithium bromide solution to the absorber compartment when the chiller was activated again.

Hitherto there was generally provided a conduit from the bottom of the evaporator to an appropriate location in the lithium bromide circuit.

The exit from the evaporator was generally provided with a valve and when this was not tightly closed, even a small leakage caused serious problems. In order to avoid such leakages the valves were often closed too tightly and this too causes sometimes leakages.

SUMMARY OF THE INVENTION

According to the present invention there is provided a conduit for the removal of dilute lithium bromide solution and/or non-condensables from the evaporator of a chiller of the type defined above, which is provided with means for tight closure and disconnection when not in use. According to a preferred embodiment of the invention the conduit leads to the purge storage tank and thus any entrained air or non-condensables are vented and the dilute solution is recirculated to the absorber.

The outlet from the evaporator is provided with a valve which is closed and disconnected, and only when from time to time it is desired to remove dilute lithium bromide this line is connected to a further conduit and the valve is opened. After removal of the dilute solution this line is again disconnected and thus any possible leakage is readily prevented, and if it occurs—it is immediately detected.

DETAILED DESCRIPTION OF THE INVENTION

The invention is described by way of illustration only with reference to the enclosed schematical drawing, which is not according to scale, and in which:

FIG. 1 is an elevational sectional view through a chiller according to the invention.

The chiller according to the present invention comprises a vessel 11 which houses the absorber 12 and the evaporator 13. Another vessel 14 houses the generator 15 and the condenser 16. In the evaporator 13 water accumulates at the bottom, but this is gradually contaminated with small quantities of lithium bromide. The presence of lithium bromide in the evaporator is detrimental to its performance, and thus from time to time the solution 17 must be drained and replaced by clean water. This is also required when the chiller is shut down and water from this section must be transferred to the absorber section. This is of importance when the lithium bromide solution used is a very concentrated one. The solution 17 is drained via conduit 18 and pumped via pump 19 and conduit 20 via valve 21, union joint 22 and conduit 23 to the purge storage tank 24 from where the dilute lithium bromide is returned via separator 25 and conduit 26 to the absorber 12. When not in use, the union joint 22 is disconnected and the valve 21 is closed. Thus any possible leakage of the dilute lithium bromide is prevented. Air which may be entrained at the instant when the valve 21 is opened after connection of the union joint 22 is purged to the purge storage tank, and the solution is returned to the absorber. The valve 21 can take numerous forms, such as, a diaphragm valve or an electrically operated solenoid valve. A further valve 27 is provided in conduit 23.

We claim:

1. An absorption type refrigeration system based on lithium bromide solution and water, comprising:
   a first vessel housing a condenser and a generator;
   a second vessel housing an absorber and an evaporator;
   a purge storage tank;
   conduit means for interconnecting said first vessel, said second vessel and said purge storage tank;
   a refrigeration pump for puming water containing lithium bromide from the bottom of the evaporator to nozzles spraying same into said evaporator, which water gradually becomes contaminated by additional lithium bromide carried over from the absorber; and
   an auxiliary system for removing a solution of aqueous lithium bromide from said evaporator when its concentration exceeds a certain predetermined value, said auxiliary system comprising a disconnectable conduit leading from said refrigeration pump and a valve and an union joint for connecting said disconnectable conduit to said purge storage tank, the solution being fed from said purge storage tank to the absorber after purging non-condensibles from the solution in the purge storage tank, water being introduced into said evaporator to replace the removed solution of aqueous lithium bromide, said conduit of said auxiliary system being disconnected from said purge storage tank during normal operation of said refrigeration system.

* * * * *